United States Patent [19]

Snowden et al.

[11] Patent Number: 5,001,471
[45] Date of Patent: Mar. 19, 1991

[54] PAGING SYSTEM EMPLOYING DESIGNATED BATCH INFORMATION SERVICE DATA MESSAGE TRANSMISSION

[75] Inventors: Gregory O. Snowden, Boca Raton; Fernando Gomez; Clifford E. Barrett, III, both of West Palm Beach, all of Fla.

[73] Assignee: Motorola, Inc., Schaumburg, Ill.

[21] Appl. No.: 456,698

[22] Filed: Dec. 26, 1989

[51] Int. Cl.$^5$ .............................................. H04B 7/00
[52] U.S. Cl. ...................... 340/825.21; 340/825.26; 340/825.27; 340/825.44; 455/343
[58] Field of Search ........... 340/311.1, 825.26, 825.27, 340/825.44, 825.45, 825.46, 825.47, 825.48, 825.21, 825.52; 455/32, 30, 343; 379/56

[56] References Cited

U.S. PATENT DOCUMENTS

| | | | |
|---|---|---|---|
| 4,473,824 | 9/1984 | Claytor | 340/825.27 |
| 4,677,434 | 6/1987 | Fascenda | 340/825.27 |
| 4,742,516 | 5/1988 | Yamaguchi | 340/825.44 |
| 4,845,491 | 7/1989 | Fascenda et al. | 340/825.44 |
| 4,873,519 | 10/1989 | Matai et al. | 340/311.1 |

Primary Examiner—Donald J. Yusko
Assistant Examiner—Dervis Magistre
Attorney, Agent, or Firm—William E. Koch; Vincent B. Ingrassia

[57] ABSTRACT

A paging system which provides both individual and information services includes a transmitter for transmitting page call address and data periodically in batches, and a population of battery saver paging receivers for receiving the transmitted call information. Each transmission batch comprises a synchronization code followed by a predetermined plurality of sequential frames. Each subscribing receiver searches for its individual service address in a first designated frame of each batch of a transmission period, and in addition, searches for its information service address in a second designated frame of a designated batch of a transmission period. Individual and information service data messages are obtained from frames subsequent the frame at which their respective address is found.

16 Claims, 6 Drawing Sheets

PAGING SYSTEM EMPLOYING DESIGNATED BATCH INFORMATION SERVICE DATA MESSAGE TRANSMISSION

CROSS REFERENCE TO RELATED APPLICATIONS

The following U.S. Pat. applications are being submitted to the U.S. Patent and Trademark Office concurrently with the instant application:

Ser. No. 456,423, filed Dec. 26, 1989, by Snowden et al., and entitled "Paging System Employing Designated Frame Commencing Information Service Data Message Transmission"; and Ser. No. 456,894, filed Dec. 26, 1989, by Snowden et al., and entitled "Paging System Employing Designated Preamble Information Service Data Message Transmission", both being assigned to the same assignee as the instant application.

BACKGROUND OF THE INVENTION

This invention relates to paging systems which provide both individual and information services to subscribing paging receivers and particularly to paging systems of the kind wherein a transmitter transmits page call address and data periodically in batches, each batch comprising a synchronization code word followed by a predetermined plurality of sequential frames; and wherein a battery saver paging receiver searches for its individual service address in a first designated frame of each batch of a transmission period, and in addition, searches for its information service address in a second designated frame of a designated batch of a transmission period. Individual and information service data are obtained from frames subsequent the frame in which their respective addresses are found.

A typical system of the above kind is one employing the well-known POCSAG coding protocol in which each paging receiver of the system is assigned a frame of each batch to search for its individual service address or addresses. To alleviate frame crowding and render an efficient throughput, the frame assignments of the paging receivers of a paging system are uniformly distributed across the frames of each batch. It is also desirable to have these paging systems support information services of the kind where all users of paging receivers subscribing to the service can be automatically provided with information service data such as stock prices, sports results, weather reports, . . . etc.

Accordingly, each paging receiver subscribing to an information service is typically programmed to respond to both an information service address and at least one individual service address. If the POCSAG method of frame assignment is used, i.e. for a given paging receiver, all addresses thereof are assigned to only one frame of a batch, all pagers must have both their individual and information service addresses in the same frame. Under these conditions, the paging system must transmit the information services data repeatedly for each frame of a batch in order to provide this data to all of the subscribing pagers. Since the information services data streams are generally long, retransmission for each frame of a batch results in a loss of valuable transmission air time which correlates directly to loss of profitability.

A solution to the aforedescribed drawback is to assign all paging receivers subscribing to both an information service and an individual service to a common frame of a batch, thereby requiring only one transmission of the information services data stream for each update and no retransmissions for other frames of the batch. This solution also results in a number of difficulties. First, when the number of information service paging receivers of a system is large, frame crowding of one frame of a batch occurs which creates system loading and throughput problems. Secondly, paging receivers currently in service may wish to add the information service capability which currently requires the inconvenience of changing the frame of their individual address to the common information service frame. This may also result in the pager being eliminated from a group call group which is confined to the original individual address frame. Alternatively, if the pager is forced to search for individual and group addresses in one frame and information service data in another frame of each batch, battery life of the paging receiver will be significantly degraded.

It is an object of the present invention to provide an improved paging system, transmitter, and paging receiver wherein the above disadvantages may be overcome or at least alleviated.

SUMMARY OF THE INVENTION

A system for selective radio communication of call information includes a transmitter which is operative to transmit the call information periodically in transmission periods comprising a plurality of batches to a population of selectively addressable receivers. Each transmission batch commences with a predetermined synchronization code followed by a predetermined plurality of sequential frames which may include an individual selective call address of a receiver followed by an individual or group data message for the addressed receiver. Each receiver of the population is assigned one frame of each transmission batch and is operative, upon recognition of a received synchronization code, to search for its individual selective call address in the assigned frame of each transmission batch and, when addressed, to receive the associated data message in subsequent frames.

In accordance with the present invention, the transmitter also transmits an information service call address solely in a common frame following the synchronization code of a predetermined batch of a transmission period followed by an associated information service data message in subsequent frames. In addition, each receiver of a subset of information service subscribing receivers of the population of receivers is programmed to search, upon recognition of the predetermined batch, for the information service call address solely in the common frame and, when addressed by the information service, to receive the associated information service data message in frames subsequent the common frame.

In another aspect of the invention, the transmitter is operative to transmit a unique information service call address for each of a plurality of information services. Each information service call address is transmitted solely in a common frame of a single corresponding predetermined batch of a transmission period. The associated information service data message is transmitted in frames subsequent the corresponding common frame. In addition, a receiver of the subset of receivers is programmed to search, upon recognition of the information service batch, for the corresponding information service call address in the common frame thereof and, when addressed by the corresponding information service, to receive the associated information service data message in frames subsequent the common frame.

BRIEF DESCRIPTION OF THE DRAWINGS

One system for selective radio communication of information from a transmitter to a population of selectively addressable receivers will now be described, by way of example only, with reference to the accompanying drawings, in which.

DETAILED DESCRIPTION OF THE PREFERRED EMBODIMENT

Figure 1:
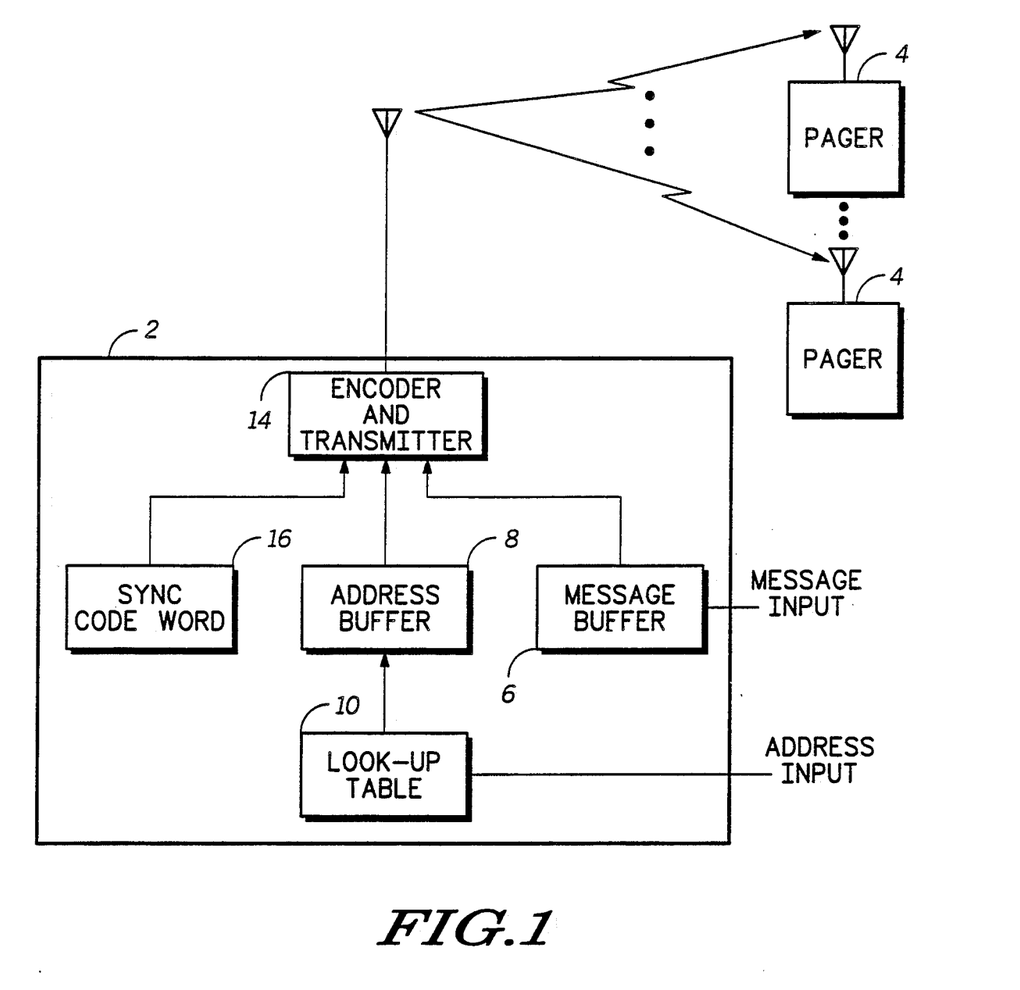
FIG. 1 is a block diagram schematic of a paging system including a transmitter and paging receivers suitable for embodying the principles of the present invention.

Referring firstly to FIG. 1, a paging system employing Post Office Code Standardization Advisory Group (POCSAG) coding protocol, for example, includes a fixed transmitter terminal 2 and a population of portable battery powered paging receivers 4.

The transmitter terminal 2 includes a buffer store 6 for holding an input message to be transmitted and a buffer store 8 for holding a call address of a paging receiver to which the message is to be transmitted. The transmitter terminal 2 also includes a look-up table 10 containing designated frame information for each paging receiver call address in the system. The transmitter terminal 2 also includes encoding and radio frequency (RF) transmission circuitry 14. Further included is a buffer memory 16 for storing the code of the sync word of the POCSAG protocol which is provided to the transmitter circuitry 14. Operation of the transmitter terminal 2 will be explained in greater detail hereinbelow.

Figure 2:
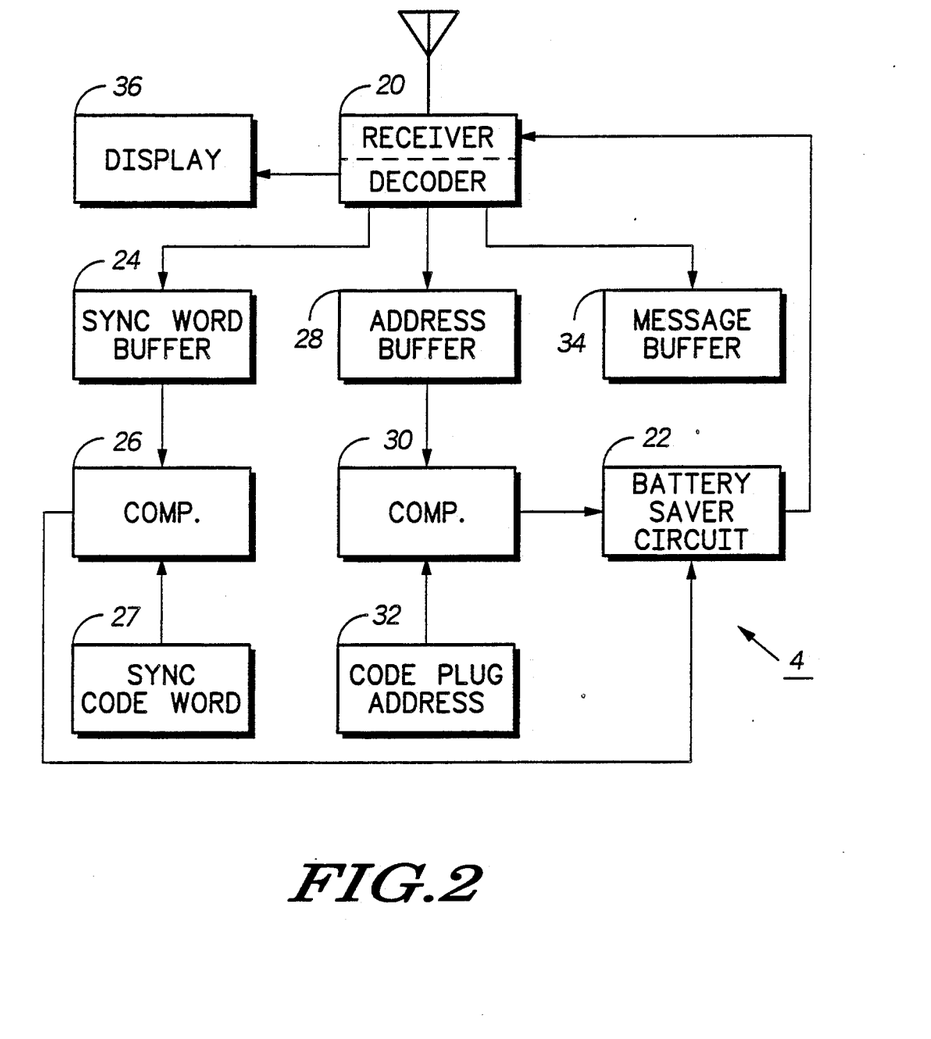
FIG. 2 is a functional block diagram schematic of a paging receiver suitable for use in the embodiment of FIG. 1.

Referring to FIG. 2, each receiver 4 includes RF circuitry 20 having receiving and decoding portions, the operation of which is controlled by a conventional battery saver circuit 22. Each receiver 4 also includes a buffer store 24 for holding a received synchronization code word, a comparator function 26 for comparing the received synchronization code word with a predetermined synchronization code word which may be stored in a memory 27, a buffer store 28 for holding a received call address or addresses, a comparator function 30 for comparing the received address or addresses with predetermined address(es) pre-programmed into the pager in a memory 32 and a buffer store 34 for holding received data message(s).

The transmitter terminal 2 may transmit data messages to receivers 4 in two modes: (i) by an individual or group call in which a data message is preceded by an individual selective call address, or (ii) by an information service call in which an information service data message is preceded by a call address associated with the information service for reception only by receivers of the system subscribing to the information service and programmed to process information service data messages in response to the information service's call address.

Figure 3:
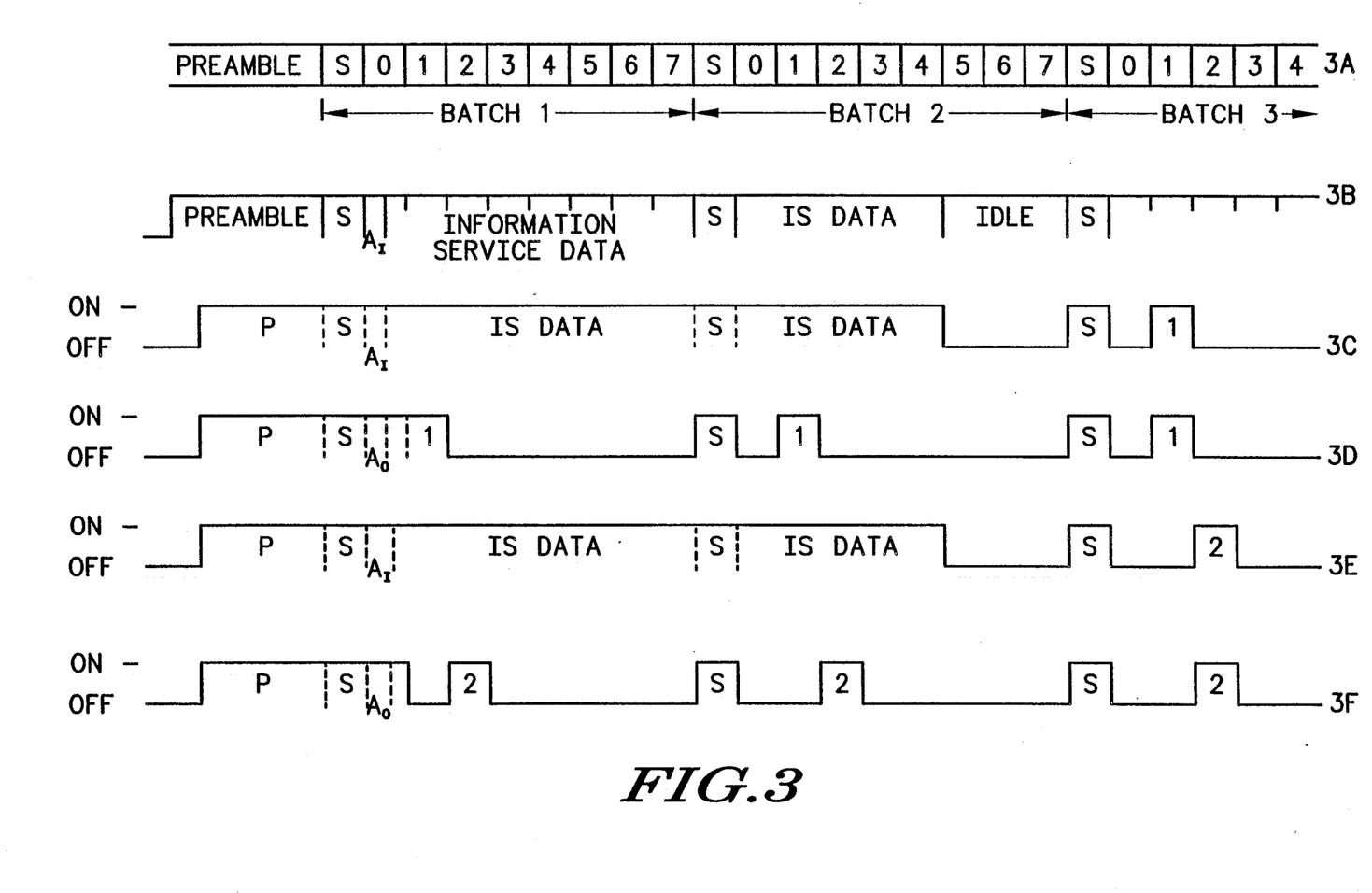
FIG. 3 includes time based representations A through F of a plurality of batches of a transmission period illustrating the signalling format and pager operation regarding individual and information service calls suitable for use in the embodiment of FIG. 1.

Referring now also to FIG. 3, the system employs RF binary coded signalling which may be, for example, in the POCSAG code format as shown in illustration A. Briefly, the POCSAG code format consists of at least a 576-bit preamble and one or more batches of code words. Each batch is preceded by a 32-bit frame synchronization code word, denoted as S, and comprises eight (8) 64-bit address frames, denoted as 0–7, of two 32-bit selective call address, data words, or idle code words each. The frame synchronization code word S marks the commencement of each batch of code words. The POCSAG code is well known and will not be described in further detail. A fuller explanation of the code may be found in "Theory/Maintenance Manual", Reference 68P81047C95-O, available from Motorola Communications & Electronics, Inc., 1309 E. Algonquin Road, Schaumburg, Ill. 60196.

Presently, for each individual or group call message to be transmitted, the encoding and transmission circuitry 14 transmits, at the beginning of each transmission period, a preamble followed by the synchronization code word S. The transmitter then consults the address/frame information look-up table 10 to determine in which predetermined frame following the synchronization code word the intended receiver, whose address is held in store 8, expects its individual selective call address to be transmitted, and transmits the intended receiver's individual address in the subsequent frame determined by the look-up table information in dependence on the individual address of the intended receiver. If the intended receiver's address is not transmitted in the first frame following the synchronization code word, the transmitter may transmit idle code words in the intervening frame or frames until it reaches the predetermined frame in which the individual address is to be transmitted. Following the frame containing the intended receiver's address, the transmitter may encode and transmit in such subsequent frames the data words of the associated individual or group message held in the store 6. After each eight frames have been transmitted, the synchronization code word S is periodically transmitted commencing the next batch of frames and the data message may continue into the frames of the next batch.

In accordance with the present invention, for each information service call message to be transmitted which may be stored in the buffer 6, there is a corresponding information service call address stored in buffer 8 of the terminal 2. Accordingly, the encoding and transmission circuitry 14 of terminal 2 may be controlled to also transmit the information service call message information periodically during certain transmission periods to subscribers of the system having receivers programmed to receive and process such information service call messages as will be described in greater detail hereinbelow.

As illustrated in time based waveform B of FIG. 3, for example, the circuit 14 of the terminal 2 may transmit, at the beginning of a transmission period in accordance with the POCSAG protocol, a preamble followed by the synchronization code word S obtained from store 16. Thereafter, the circuit 14 may encode and transmit an information service call address $A_I$ obtained from buffer 8 in a common frame following the synchronization code word of a predetermined batch of a transmission period, the call address $A_I$ being followed by the associated information service data message, obtained from buffer 6, in subsequent frames.

In the present embodiment, as shown in waveform B, the predetermined batch is the first batch and the common frame thereof is frame 0. In this example, the associated data message is transmitted in the subsequent frames 1-7, followed by the transmission of the sync code word S of the second batch, which is followed by a continuation of data message transmission through frame 4 of the second batch. Further in the present example, the remaining frames 5-7 of the second batch remain idle, i.e. nothing being transmitted and transmissions may continue in batch 3.

In each receiver 4 (see FIG. 2), the decoder portion of the functional block 20 may be programmably set to enable the receiver to respond to the predetermined information service batch of a transmission period, preferably batch 1, to search for the information service call address solely in the common frame, preferably frame 0, thereof, and when such call address is found therein, the circuit 20 responds by receiving the associated information service data message in frames subsequent the common frame.

Figure 5A:
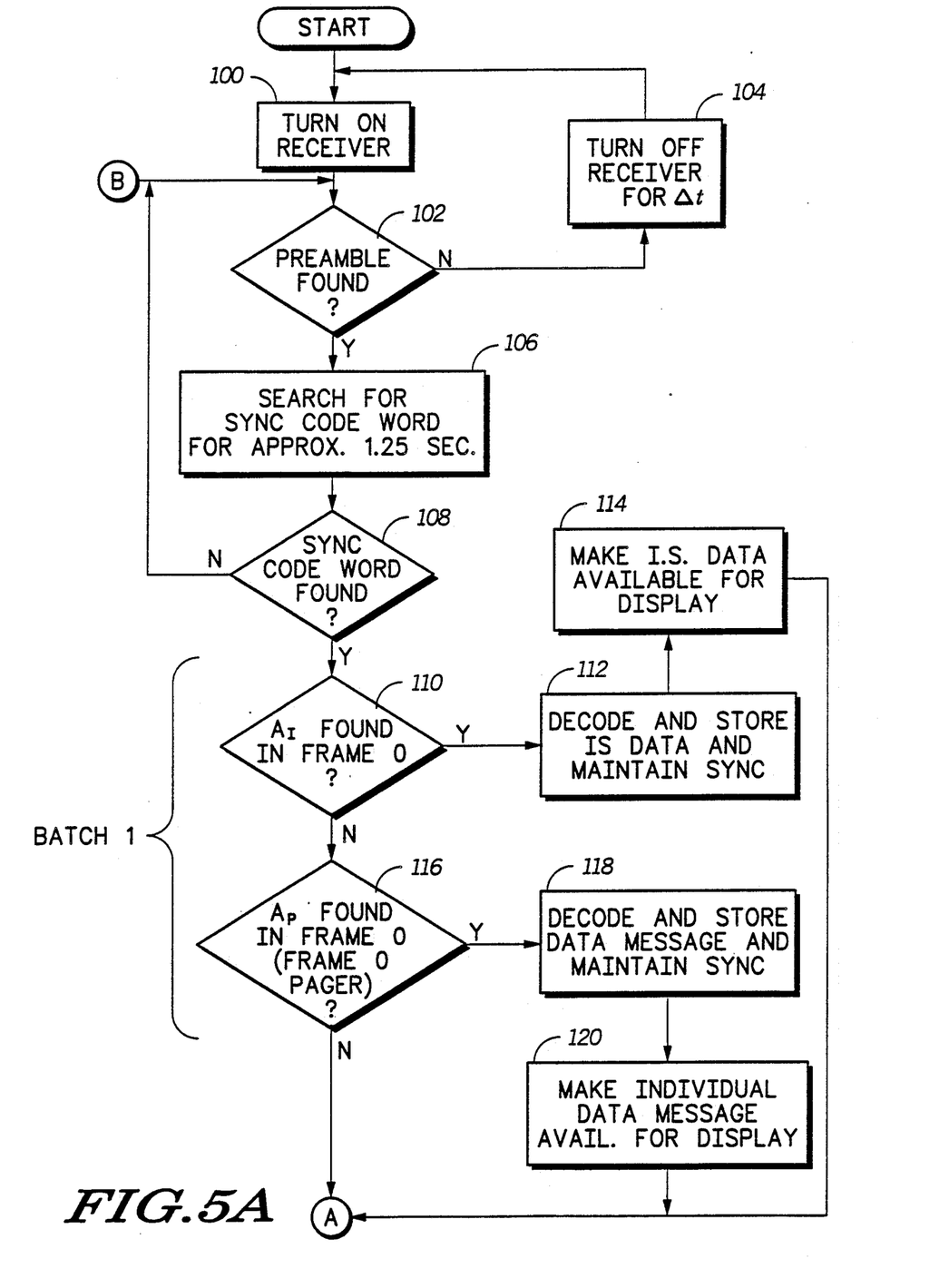
FIGS. 5A and 5B collectively depict a flow chart illustrating paging receiver operations suitable for use in the embodiment of FIG. 1.

More specifically, referring to the flow chart of FIG. 5A, the battery saver circuit 22 of each battery powered receiver 4 activates the RF receiving portion of the circuitry 20 for substantially 217 ms every 1.047 s, for example, in block 100. If the preamble is not decoded by the circuit 20 while the receiver portion thereof is activated by the battery saver circuit 22 as determined by decisional block 102, the battery saver circuit 22 deactivates the receiver portion for approximately one (1) second, for example, in block 104 in order to extend battery life. If the preamble is received and decoded during the period while the receiver is activated as determined by block 102, the receiver portion remains activated until a synchronization code word S has been received as determined by blocks 106 and 108. The received synchronization code word is held in the buffer 24 and is compared with the predetermined synchronization code word stored in memory 27 of a receiver 4. If the sync code word is not found in the received transmission within a predetermined interval of time, say 1.25 sec., for example, then the receiver once again is governed to search for the preamble in block 102.

If the synchronization code word S is found by block 108, then the battery saver circuitry 22 maintains the receiver portion of circuit 20 active to receive transmissions so that the decoder portion may search for a call address in the immediately subsequent frame 0 of the first batch. The received address(es) of frame 0 of the first batch may be stored in the buffer 28 for comparison with the predetermined call address $A_I$ of the information service to which the receiver subscribes and which has been pre-programmed into the receiver in the code plug memory 32. As determined by decisional block 110, if the comparison detects that a received call address matches the pre-programmed information service address $A_I$, the receiver portion remains activated to receive and decode the information service data message, while maintaining synchronization, in the frames immediately following the address frame as illustrated by the waveform C of FIG. 3. This is accomplished by block 112 which also stores the decoded data message in the memory 34. Thereafter, the data message is made available for display on a display 36 of the receiver 4 by block 114.

If no match of the subscribed to information service address $A_I$ is detected by block 110, the receiver, if a frame 0 receiver, tries to match its individual address Ap stored in code plug 32 to the received and decoded address of frame 0 in block 116. If it finds its individual call address in frame 0, the receiver decodes the individual or group data message received in the subsequent frames, while maintaining synchronization, and stores such data message in the buffer 34 thereof in accordance with the operations of block 118. Thereafter, the individual or group data message is made available for display on display 36 by block 120. If the decision of block 116 is negative or upon the completion of the operation of block 120, the processing of receiver 4 continues at block 122 of FIG. 5B which turns off the receiver portion of circuit 20 until the next sync code word or designated address frame occurs as shown by waveform C.

For the example in which a receiver is programmed to receive its individual address in frame 1 of each batch and no address $A_1$ is found in frame 0 immediately following the synchronization code word of batch 1, then the receiver remains activated to search frame 1 of batch 1 as shown by waveform D of FIG. 3. This is accomplished by the operations of decisional blocks 124 and 126 of FIG. 5B in which the received and decoded address(es) of frame 1, batch 1 stored in buffer 28 are compared with the receiver's individual address Ap stored in memory 32 utilizing comparison function 30.

Figure 5B:
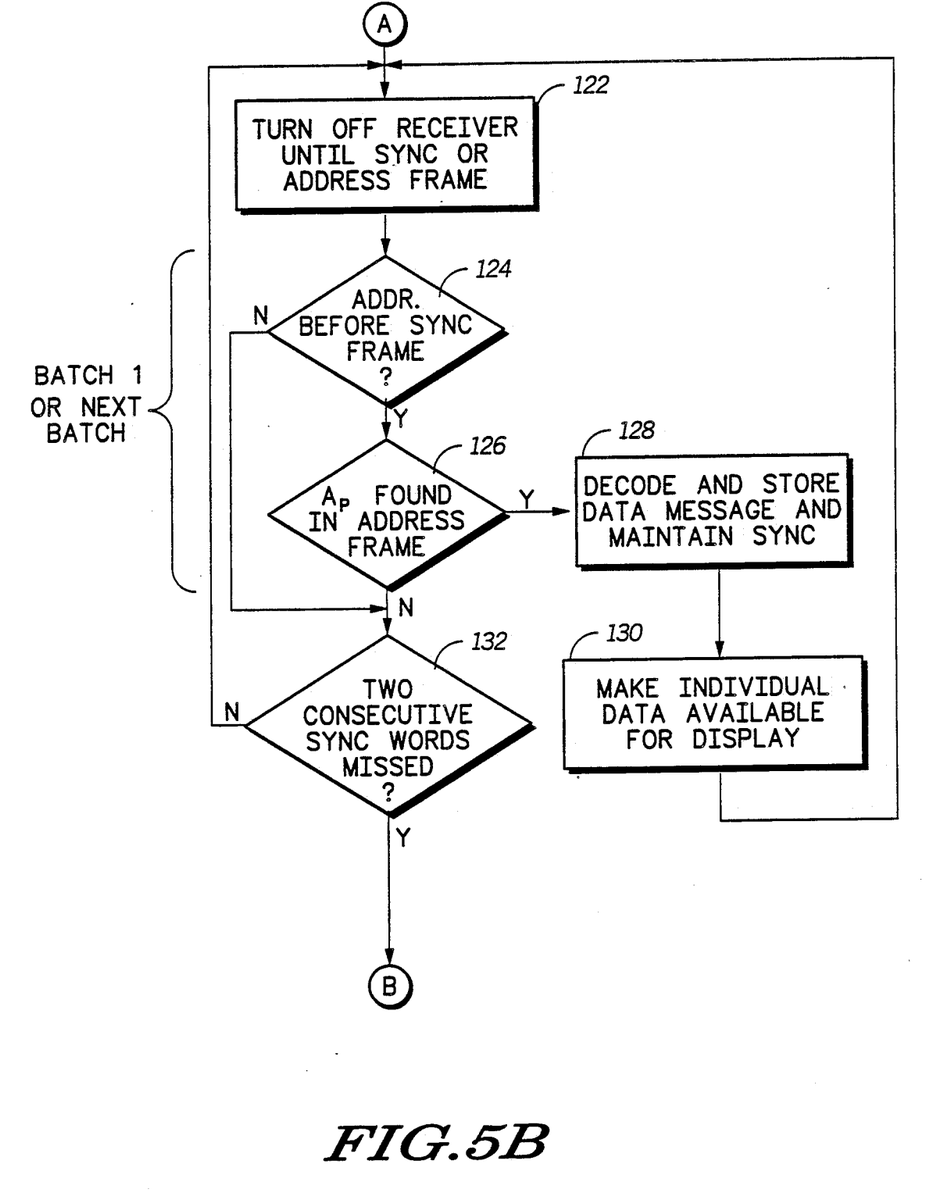

If the comparison detects that a received and decoded address of frame 1 matches the pre-programmed individual address Ap, the receiver remains activated to receive and decode the individual or group data message in the frames immediately following the designated individual address frame while maintaining sync. This is accomplished by the operations of block 128 which also stores the data message in the buffer 34. Such data message is made available for display by the operation of block 130. If no match of the receiver's individual address Ap is detected by block 126 or upon completion of the operation of block 130, processing is returned to block 122 in which the receiver is deactivated to be periodically reactivated later in either a sync code word or designated address frame by the battery saver circuit 22 in order to search for a received sync or address word as described above. Should two or more consecutive sync code words go undetected by the decoder 20 as determined by block 132, then processing is returned to block 102.

If the receiver expects to receive its individual address Ap in frame 2 of each batch as shown by the waveforms E and F of FIG. 3, the battery saver circuitry 22 maintains the receiver active to receive an address in the frames immediately subsequent frame 2. Accordingly, the received and decoded address(es) of frame 2 are stored in the buffer 28 and the stored received address or addresses in the frame 2 are compared with the receiver's individual address Ap. If the comparison detects that a received address matches the pre-programmed individual address Ap, the receiver remains activated to receive individual or group message data in the frames immediately following the address frame. If no match of the receiver's individual address Ap is detected as shown by waveform F, the receiver is deactivated to be periodically reactivated later by the battery saver circuit 22 in order to search for its individual address in subsequent batches of the transmission period as described above.

Accordingly, if the receiver expects to receive its individual address in the third or a later frame of each batch of a transmission period, the battery saver circuitry 22 deactivates the receiver after frame 0 of the first batch until the expected frame occurs, at which time the battery saver circuitry reactivates the receiver to receive the transmitted information of such address frame. The received information or address(es) are stored in the buffer 28 for comparison with the receiver's individual address Ap. If the comparison detects that a received address matches the pre-programmed individual address Ap, the receiver remains activated to receive individual or group data message in the frames immediately following the address frame. If no match of the receiver's individual address Ap is detected, the receiver is deactivated to be periodically reactivated in frame 3 of subsequent batches of the transmission period by the battery saver circuit in order to search for its individual call address as described above.

Figure 4A:
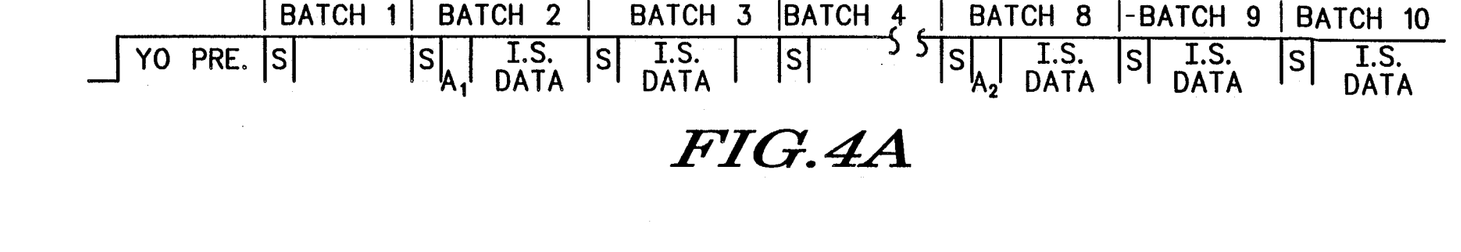
FIG. 4 includes time based representations A, B, and C illustrating the signalling format and paging receiver operations regarding multiple information service transmissions suitable for use in the embodiment of FIG. 1.
Figure 4B:
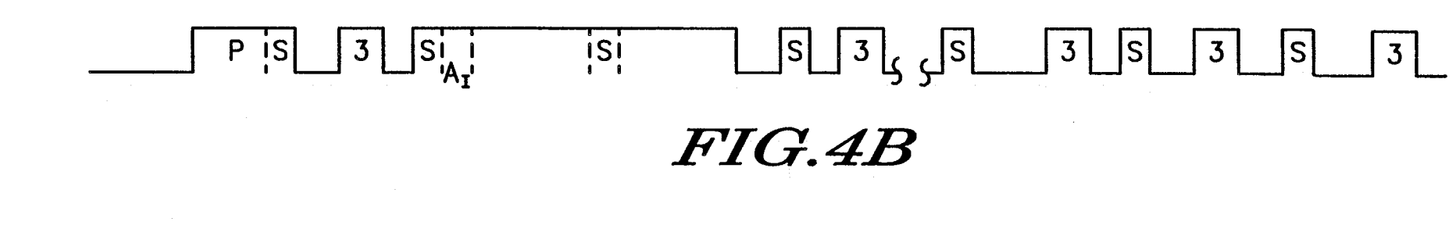
Figure 4C:
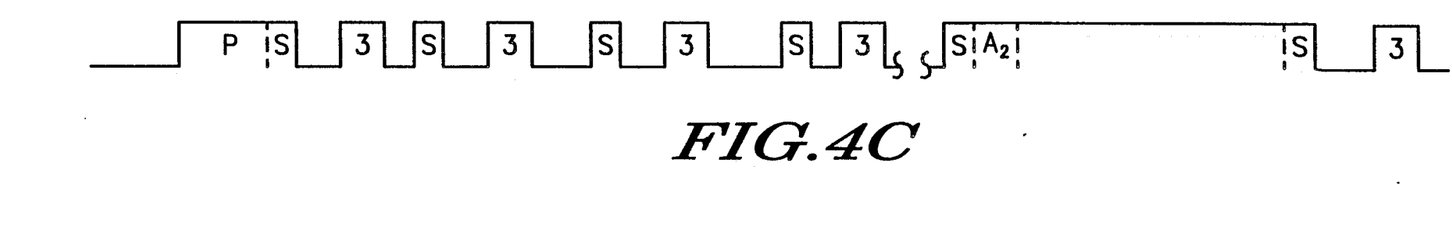

Time waveform A of FIG. 4 exemplifies the transmission of data messages of multiple information service call addresses $A_1$ and $A_2$, for example. Note, for the instant example, that the predetermined common frame of information service address $A_1$ is frame 0 of batch 2 and of $A_2$ is frame 0 of batch 8. Accordingly, the associated data messages of each address are transmitted in the respective subsequent frames which for $A_1$ extends through batch 2 and carries over into batch 3, and for $A_2$, extends through batch 8 and carries over into batches 9 and 10. In connection with the transmission of multiple information services, one group of receivers may be subscribing to one service and another group subscribing to the other service. Time waveform B of FIG. 4 exemplifies the operation of a receiver of the one group which subscribes only to service $A_1$ and the waveform C of FIG. 4 exemplifies the operation of a receiver of the other group which subscribes only to service $A_2$.

Accordingly, when a receiver of the one group detects the information service call address $A_1$ in frame 0 of batch 2, it responds by receiving, decoding and storing the associated data message found in the subsequent frames in a similar manner as described above in connection with the flow chart of FIGS. 5A and 5B. Note that since the user of the receiver of the one group does not subscribe to the service $A_2$, the receiver is not programmed to be activated in frame 0 of batch 8 to search for the information service address $A_2$. Similarly, when a receiver of the other group detects the information service call address $A_2$ in frame 0 of batch 2, it likewise responds by receiving, decoding and storing the associated data message found in the subsequent frames. Also, since the user of the receiver of the other group does not subscribe to the service $A_1$, the receiver is not programmed to be activated in frame 0 of batch 2 to search for the information service call address $A_1$.

A user, of course, may subscribe to both services $A_1$ and $A_2$ in which case, his receiver will be programmed to be activated in both frame 0 of batch 2 and frame 0 of batch 8, for example, to search for the respective information service call addresses and if either or both are found, the receiver shall remain active to process the respective data message(s) as described supra. In either case, it is understood that the receiver will continue to be activated for the designated frame in each batch to search for its individual call address(es). The examples of time waveforms B and C of FIG. 4 both correspond to a frame 3 receiver.

It will be appreciated that in a practical embodiment, the step of consulting a look-up table in the transmitter terminal 2 may be conveniently performed in software running in a microprocessor (not shown), as will the steps in the receiver of detecting the predetermined batch using a synchronization code word S, for example, and detecting the information service address $A_I$ and the individual address Ap. It will also be appreciated that a single store may be used in the receiver for storing a received synchronization code word and a received address frame since these parameters are received sequentially and will not interfere with one another. For a description of a suitable receiver and transmitter terminal in greater detail, reference is made to the U.S. Pat. Nos. 4,518,961, entitled "Universal Paging Device with Power Conservation", issued 5/21/85 to Davis et al. and 4,427,980, entitled "Encoder for Transmitted Message Activation Code", issued 1/24/84 to Fennell et al., both assigned to the same assignee as the instant application and both references being incorporated by reference herein.

It will be realized that compared with a conventional POCSAG system, the information service address and the individual address of a particular receiver are not constrained to occur in the same frame, thus eliminating frame crowding and throughput problems which could otherwise occur.

It will be appreciated that instead of the information service address being transmitted in the frame immediately subsequent to the synchronization code word, the system could alternatively operate, with similar advantages of eliminated frame crowding and uncompromised throughput, with the information service address being transmitted in any other predetermined frame subsequent to the synchronization code word, e.g. the second or third frame.

While the present invention has been described based on the embodiments depicted in FIGS. 1–5 of the instant application, it is also understood by all those skilled in the pertinent art that modifications, additions, and deletions may be made thereto without deviating from the principles thereof. Accordingly, the present invention should not be limited to any single embodiment, but rather construed in breadth and scope in accordance with the recitation of the appended claims.

What is claimed is:

1. A system for selective radio communication of call information from a transmitter to a population of selectively addressable receivers, said transmitter being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, each receiver being assigned one frame of each transmission batch, and operative, upon recognition of a received synchronization code, to search for its individual selective call address solely in said assigned frame in the batch and, when addressed, to receive the associated data message in subsequent frames, said system comprising:

said transmitter for also transmitting an information service call address solely in a common frame following the synchronization code of a single predetermined batch of a transmission period followed by an associated information service data message in subsequent frames; and a subset of information service subscribing receivers of said population of receivers, each said receiver of said subset being programmed to search, upon recognition of said single predetermined batch, for said information service call address solely in said common frame and, when addressed by said information service, to receive the associated information service data message in frames subsequent said common frame.

2. The system according to claim 1 wherein the transmitter is operative to transmit the information service call address in a common frame immediately following the synchronization code of the predetermined batch.

3. The system according to claim 1 wherein the predetermined batch is the first batch of the plurality of batches of a transmission period.

4. The system according to claim 1 using POCSAG coding.

5. A system according to claim 1 wherein:
the transmitter is operative to transmit a unique information service call address for each of a plurality of information services, each information service call address transmitted solely in a common frame of a single corresponding predetermined batch of a transmission period, the associated information service data message being transmitted in frames subsequent the corresponding common frame; and a receiver of a subset of receivers of the population subscribing to the plurality of information services is programmed to search, upon recognition of the information service batch, for the corresponding information service call address in said common frame thereof and, when addressed by said corresponding information service, to receive the associated information service data message in frames subsequent said common frame.

6. The system according to claim 5 wherein the transmitter is operative to transmit an information service call address in a common frame immediately following the synchronization code of its corresponding predetermined batch.

7. A transmitter for use in a system for selective radio communication of call information to a population of selectively addressable receivers, said transmitter being operative to transmit said information periodically in transmission periods comprising a plurality of batches, each batch commencing with a predetermined synchronization code followed by a predetermined plurality of sequential frames which may include an individual selective call address of a receiver followed by an individual or group data message for said addressed receiver, said transmitter comprising:
means for transmitting an information service call address solely in a common frame following the synchronization code word of a single predetermined batch of a transmission period; and
means for transmitting an information service data message sequential to the corresponding information service call address in frames subsequent said common frame.

8. The transmitter according to claim 7 operative to transmit the information service call address in a common frame immediately following the synchronization code of the predetermined batch.

9. The transmitter according to claim 7 wherein the predetermined batch is the first batch of the plurality of batches of a transmission period.

10. The transmitter according to claim 7 using POCSAG coding.

11. The transmitter according to claim 7 wherein:
the transmitter is further operative to transmit a unique information service call address for each of a plurality of information services, each information service call address transmitted solely in a common frame of a single corresponding predetermined batch of a transmission period, the associated information service data message being transmitted in frames subsequent the corresponding common frame.

12. A receiver for use in a system for selective radio communication of call information from a transmitter to a population of selectively addressable receivers, said transmitter being operative to transmit said information periodically in transmission periods comprising a plurality of batches each commencing with a predetermined synchronization code followed by a predetermined plurality of sequential frames which may include an individual selective call address of a receiver followed by an individual or group data message for said addressed receiver, said transmitter further operative to transmit an information service call address solely in a common frame following the synchronization code of a single predetermined batch of a transmission period followed by an associated information service data message in subsequent frames, said receiver being assigned one frame of each transmission batch, and operative, upon recognition of a received synchronization code, to search for its individual selective call address solely in said assigned frame in each batch and, when addressed, to receive the associated data message in subsequent frames, said receiver comprising:
first means programmably set to enable said receiver to respond to the single predetermined batch of a transmission period to search for the information service call address solely in said common frame thereof; and
second means responsive to finding the information service call address in said common frame to receive the associated information service data message in frames subsequent said common frame.

13. The receiver according to claim 12 wherein said first means is programmably set to search for the information service call address in a common frame immediately following the synchronization code word of the predetermined batch.

14. The receiver according to claim 12 wherein the first means is programmably set to respond to the first batch of the plurality of batches of a transmission period.

15. The receiver according to claim 12 wherein the transmitter is operative to transmit a unique information service call address for each of a plurality of information services, each information service call address transmitted solely in a common frame of a single corresponding predetermined batch of a transmission period, the associated information service data message being transmitted in frames subsequent the corresponding common frame; and wherein said first means is programmably set to search, upon recognition of the information service batch, for the corresponding information service call address in said common frame thereof.

16. The receiver according to claim 15 wherein said first means is programmably set to search for the information service call address in a common frame immediately following the synchronization code of the predetermined batch.

* * * * *